United States Patent [19]

Schobinger et al.

[11] 4,360,718
[45] Nov. 23, 1982

[54] SWITCHING MECHANISM FOR FLUID-OPERATED GEAR SHIFTERS

[75] Inventors: Alfred Schobinger; Günter Schwarz; Willy Beig, all of Friedrichshafen, Fed. Rep. of Germany

[73] Assignee: Zahnradfabrik Friedrichshafen Aktiengesellschaft, Friedrichshafen, Fed. Rep. of Germany

[21] Appl. No.: 185,884

[22] Filed: Sep. 10, 1980

[30] Foreign Application Priority Data

Sep. 13, 1979 [DE] Fed. Rep. of Germany ....... 2937140

[51] Int. Cl.$^3$ ............................................. H01H 9/06
[52] U.S. Cl. ................................................. 200/61.88
[58] Field of Search .................... 200/4, 6 A, 7, 18 R, 200/61.85–61.91, 153 T, 157, 335, 336

[56] References Cited

U.S. PATENT DOCUMENTS

| | | | |
|---|---|---|---|
| 2,545,172 | 3/1951 | Sensinger | 200/336 X |
| 3,142,227 | 7/1964 | Stringer | 200/157 X |
| 3,198,922 | 8/1965 | Rohacs | 200/157 |
| 3,293,381 | 12/1966 | Eitel | 200/18 X |
| 3,326,315 | 6/1967 | Richards | 200/61.88 X |
| 3,708,636 | 1/1973 | Sobchak | 200/6 A |
| 3,731,013 | 5/1973 | Nightengale | 200/6 A X |
| 4,281,526 | 8/1981 | Lipschutz | 200/61.88 X |

FOREIGN PATENT DOCUMENTS 2502578 10/1977 Fed. Rep. of Germany .

*Primary Examiner*—James R. Scott
*Attorney, Agent, or Firm*—Karl F. Ross

[57] ABSTRACT

A shift lever for the selective actuation of power tools on a utility carries a rotary and axially shiftable knob which can be indexed by ball checks in a plurality of angular positions to establish different speed ratios of the vehicular transmission by actuating respective microswitches through cams bearing upon mobile bodies which are lodged in apertures of a stationary collar surrounding an extension of the knob. A rocker switch on that knob can be flipped by the fingers of the operator to switch between forward and reverse drive.

9 Claims, 5 Drawing Figures

SWITCHING MECHANISM FOR FLUID-OPERATED GEAR SHIFTERS

FIELD OF THE INVENTION

Our present invention relates to a switching mechanism for the control of fluid-operated (e.g. hydraulic) gear shifters in a transmission between the engine and the traction wheels of a heavy-duty automotive vehicle, such as a bulldozer or a snow plow, having one or more fluid-operated working implements powered by the engine.

BACKGROUND OF THE INVENTION

For the control of a hydraulic working implement on such a vehicle it is already known, e.g. from German Pat. No. 2,502,578, to provide a lever which is universally jointed on a base for selective displacement into any of a plurality of implement-controlling positions. This lever is usually manipulated by the right hand of the operator whose left hand must displace a shift lever adjacent the steering wheel to establish the various forward and reverse speed ratios or "gears" for the drive of the vehicle. Since the operator must also handle the steering wheel, the gear-shift lever and the implement-controlling lever could not be manipulated simultaneously.

OBJECT OF THE INVENTION

The object of our present invention, therefore, is to provide a switching mechanism enabling the driver to operate a gear shifter and an implement controller with one and the same hand.

SUMMARY OF THE INVENTION

We realize this object, in accordance with our present invention, by the provision of a knob movably mounted on a universally jointed lever of the aforementioned type, that lever being selectively displaceable into a plurality of implement-controlling positions, in combination with electrical switch means on the lever settable by the knob to close different control circuits for the gear-shifting means in the vehicular transmission when the knob is moved into any of several transmission-controlling positions relative to the lever.

According to a more particular feature of our invention, the knob has a stem which is rotatably mounted in a housing formed by the lever and which may also be axially shiftable into a neutral position in which the traction wheels are decoupled from the engine. In its alternate axial position, in which the traction wheels are driven, the knob and the stem are rotatable into various transmission-controlling positions which are peripherally separated from one another and in which, advantageously, a plurality of microswitches forming part of the aforementioned switching means are respectively actuated by cam means carried on the stem.

According to another feature of our invention, the knob is provided with a finger-operable two-position switch for alternatively closing two further control circuits respectively establishing forward and reverse drive.

BRIEF DESCRIPTION OF THE DRAWING

The above and other features of our invention will now be described in detail with reference to the accompanying drawing in which.

SPECIFIC DESCRIPTION

Figure 1:
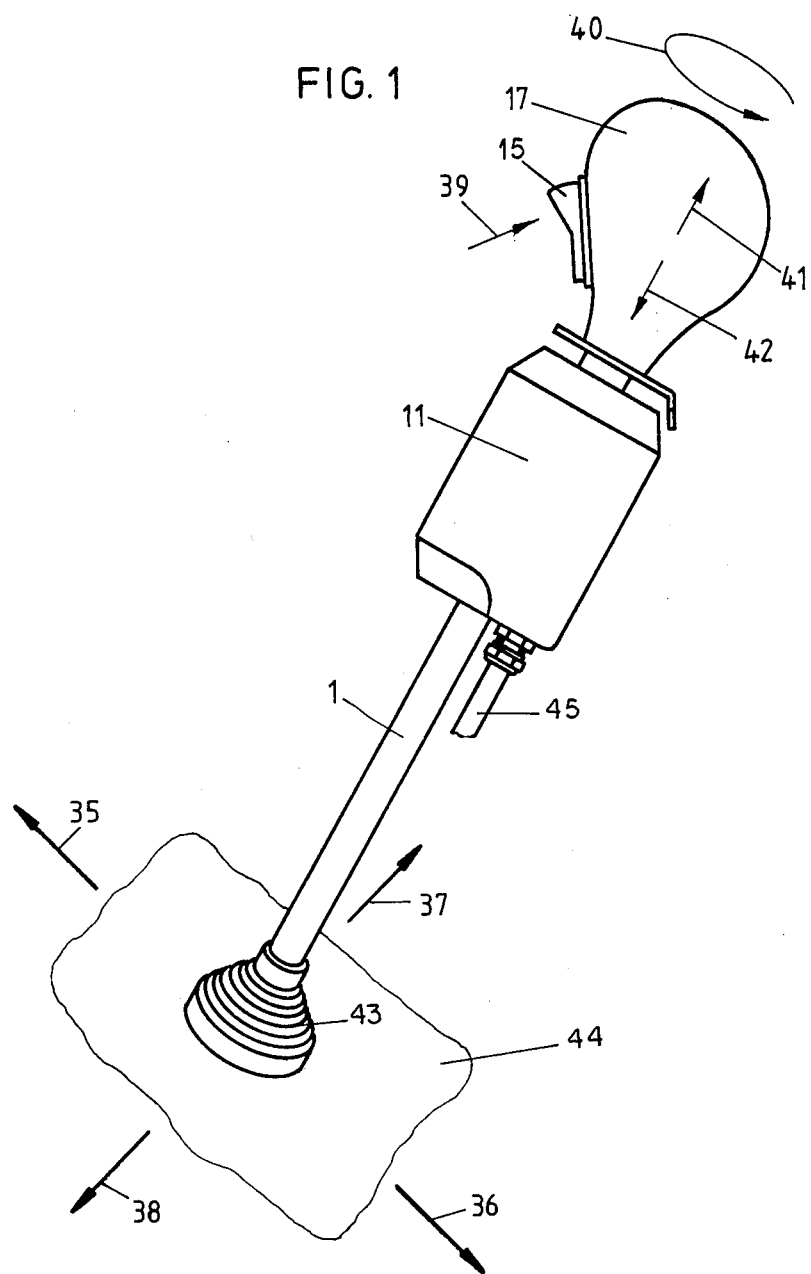
FIG. 1 is a perspective elevational view of a switching mechanism embodying our invention.

In FIG. 1 we have shown a lever 1 which is universally jointed at 43 on the floor 44 of an automotive vehicle of the aforedescribed type, not otherwise illustrated, assumed to be equipped with a working implement such as a shovel or plow. Lever 1 is selectively swingable in any of four directions indicated by arrows 35–38, these arrows respectively connoting the operations "LOWER PLOW", "RAISE PLOW", "TILT PLOW" and "LEVEL PLOW". Lever 1 is rigid with a switch housing 11 on which a control knob 17 is mounted for limited rotation about the lever axis (arrow 40) and axial shifting (arrows 41 and 42). Knob 17 also carries a rocker switch 15 which may be magnetically retained in either of its two positions, with the illustrated position generating the command "FORWARD DRIVE" while the alternate position (arrow 39) generates the command "REVERSE DRIVE". The retaining magnet or magnets may be electrically controlled in such a way that a return of switch 15 to its former position will be possible only after a certain delay. The command signals from switch 15 and from other switches inside housing 11, selectively closable by the knob 17 as described hereinafter, are fed by a flexible cable 45 to the control circuitry for the vehicular gear transmission and for the operation of the plow.

Figure 2:
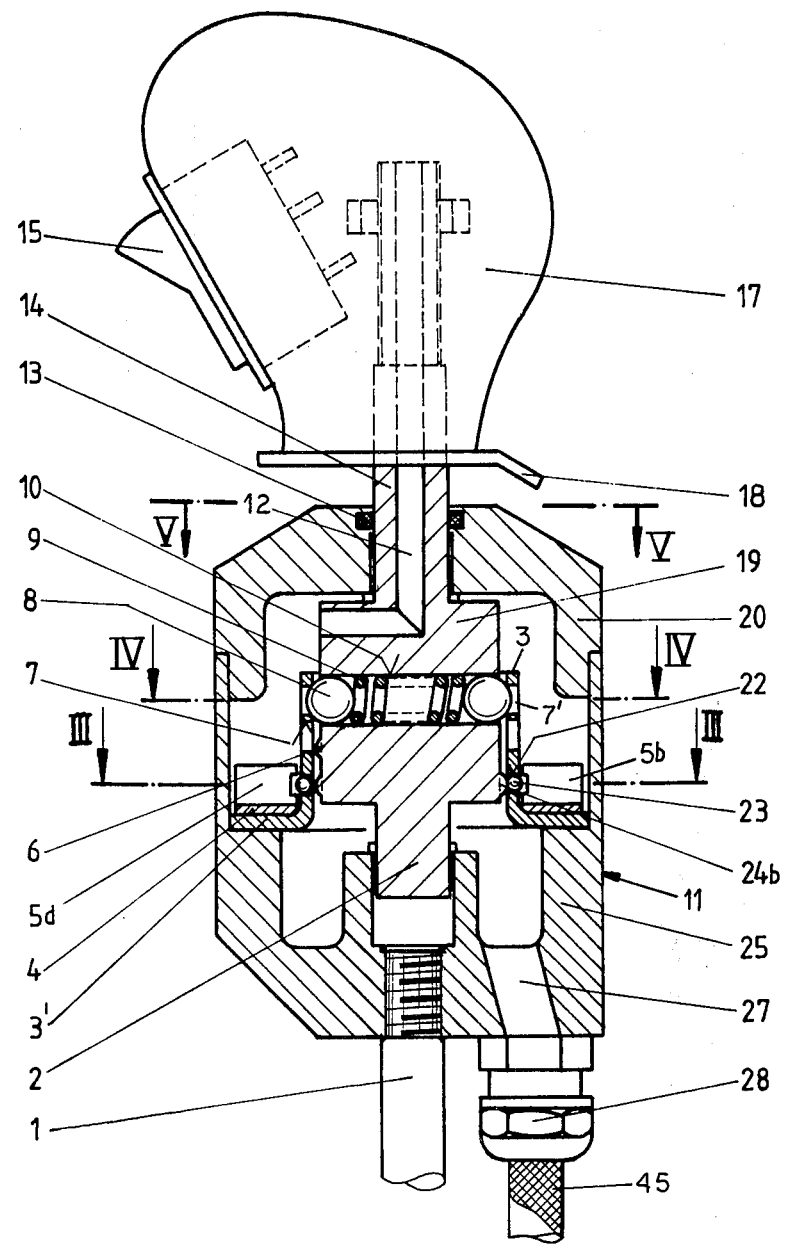
FIG. 2 shows part of the mechanism of FIG. 1 in elevational view and on a larger scale, with a switch housing illustrated in axial section.
Figure 4:
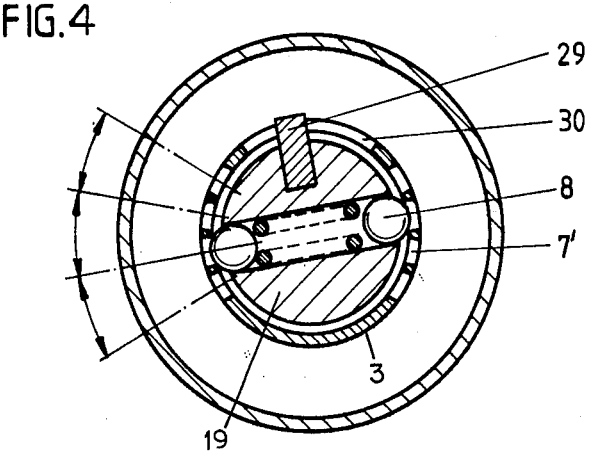
FIGS. 3–5 are cross-sectional views respectively taken on lines III—III, IV—IV and V—V of FIG. 2.
Figure 3:
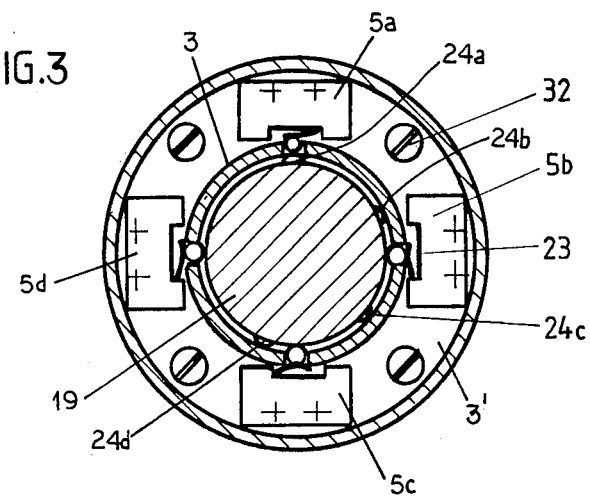

As will be apparent from FIGS. 2–4, housing 11 comprises two interfitted parts 20 and 25 forming journal bearings for upper and lower stub shafts 14 and 2 which are part of a stem supporting the knob 17, these stub shafts being integral with an intervening boss 19 of larger diameter. Boss 19 is coaxially surrounded by a cylindrical collar 3 resting with an annular flange 3' on a shoulder of lower housing part 25. This collar is provided with two axially separated rows of recesses 7 and 7', here shown as throughgoing perforations, coacting with a pair of ball checks 8 loaded by a spring 9 in a diametrical bore 10 of boss 19. As illustrated in FIG. 4 for the upper row 7', each row comprises four pairs of diametrically opposite perforations whose centers are separated from one another by arcs of about 20°. Ball checks 8 can thus index the boss 19 and the knob 17 in any of four closely spaced upper and as many lower positions. Upper shaft 14 is surrounded by a seal 13.

Flange 3', bolted to the lower housing part 25 by means of several screws 32 as shown in FIG. 3, supports four microswitches 5a, 5b, 5c and 5d in positions 90° apart. These microswitches rest on respective conductor plates 4 from which wires (not shown) extend through a channel 27 in housing part 25 to a connector 28 by which the cable 45 is attached thereto. The internal contacts of rocker switch 15 are connected to the same cable by nonillustrated wires passing partly through a channel 12 in stub shaft 14.

Figure 5:
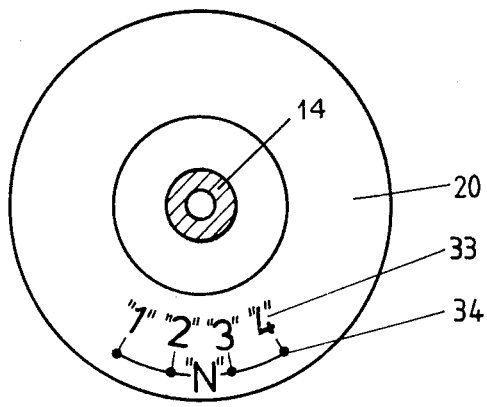

Collar 3 is further provided with four apertures which respectively confront the microswitches 5a–5d and are also spaced 90° apart. Lodged in each aperture is a mobile spherical body 23 urged inward by a contact spring of the associated microswitch unless one of several cams 24a, 24b, 24c, 24d is aligned therewith by rotation of knob 17 into a corresponding transmission-controlling position, these positions being marked "1", "2", "3" and "4" (for "first", "second", "third" and "fourth" gear) on a scale 33 of housing cover 20 as seen in FIG. 5. A pointer 18 rigid with knob 17 coacts with this scale to indicate the selected speed ratio; it will be evident that any of these four speed ratios can be selected for both forward and reverse driving as established by the position of the finger-operated switch 15. Another marking 34 adjacent scale 33 bears the designation "N" for "neutral" to indicate that the engine may be decoupled from the traction wheels of the vehicle by a downward thrust of knob 17 which causes the balls 8 to jump from a lower perforation 7 into an upper perforation 7'. The swing and the axial shift are limited by a stud 29 on boss 19, shown in FIG. 4, which traverses an arcuate slot 30 of collar 3 spanning less than 90°. The slot may have an axial extension allowing the shift into neutral and the return to the speed-selection level to be carried out only in a certain angular position, specifically position "1" of scale 33.

The indexing means 7–9, camming means 24a–24d, mobile bodies 23 and microswitches 5a–5d are similar to those disclosed in commonly owned application Ser. No. 180,348 filed Aug. 22, 1980, now U.S. Pat. No. 4,334,130, by one of us, Willy Beig.

While in the position "N" the microswitches 5a–5d may simply be left unoperated, we have shown boss 19 provided with an additional camming formation 6 which may be an arcuate rib extending over part of its periphery to close two of the microswitches simultaneously for the purpose of emitting a decoupling command.

Switch housing 11 need not be disposed near the top of lever 1, as shown, but could also be mounted at the lower end of this lever in the vicinity of the vehicular transmission.

We claim:

1. In an automotive vehicle having traction wheels driven from an engine via a transmission provided with electrically controllable fluid-operated gear-shifting means, said vehicle being further provided with a fluid-operated working implement powered by the engine, the combination therewith of a switching mechanism for the control of said implement and said gear-shifting means comprising:

a lever universally jointed on a base for selective pivotal motion into any of a plurality of implement-controlling positions;
   a housing rigid with said lever;
   a knob above said base having a stem journaled in said housing for selective rotation into a plurality of transmission-controlling angular positions relative to said lever; and
   a plurality of microswitches in said housing actuatable by cam means on said stem to close different control circuits for said gear-shifting means in said angular positions.

2. The combination defined in claim 1 wherein said stem is axially shiftable in said housing into a neutral position.

3. The combination defined in claim 2 wherein said stem is provided with an additional camming formation jointly coacting with a pair of said microswitches in said neutral position to decouple the engine from the traction wheels.

4. The combination defined in claims 2 or 3 wherein said stem and said housing are provided with indexing means for releasably retaining said knob in any one of said angular and neutral positions.

5. The combination defined in claim 4 wherein said indexing means comprises a collar in said housing coaxially surrounding said stem, said collar being provided with two axially separated rows of angularly spaced-apart recesses, and a spring-loaded ball in said stem engageable in said recesses.

6. The combination defined in claim 5 wherein said collar is provided with apertures confronting said microswitches and a set of mobile bodies in said apertures displaceable by said cam means into engagement with the microswitches respectively in line therewith.

7. The combination defined in claim 5 wherein said collar is provided with an annular flange supporting said microswitches through the intermediary of respective conductor plates.

8. The combination defined in claims 1, 2 or 3 wherein said knob is provided with a finger-operable two-position switch for alternatively closing two further control circuits respectively establishing forward and reverse drive of the traction wheels.

9. The combination defined in claim 1, 2 or 3 wherein said housing is carried on an upper end of said stem remote from said base.

* * * * *